United States Patent [19]

Molt

[11] 4,179,432
[45] Dec. 18, 1979

[54] STABILIZED POLYPROPYLENE COMPOSITIONS

[75] Inventor: Kenneth R. Molt, Montgomery, Ohio

[73] Assignee: Cincinnati Milacron Chemicals, Inc., Reading, Ohio

[21] Appl. No.: 609,816

[22] Filed: Sep. 2, 1975

[51] Int. Cl.$^2$ .............................................. C08K 5/58
[52] U.S. Cl. ........................ 260/45.75 S; 260/45.95 F
[58] Field of Search .................. 260/45.75 S, 45.95 F

[56] References Cited

U.S. PATENT DOCUMENTS

| | | | |
|---|---|---|---|
| 3,013,003 | 12/1961 | Maragliano et al. | 260/45.75 S |
| 3,015,644 | 1/1962 | Leistner et al. | 260/45.75 S |
| 3,149,093 | 9/1964 | Hecker et al. | 260/45.75 S |
| 3,282,889 | 11/1966 | Tomlinson | 260/45.75 S |

OTHER PUBLICATIONS

Crystalline Olefin Polymers—Part II, vol. XX of High Polymer Series—by Raff et al., 1964 (pp. 361–398).

*Primary Examiner*—V. P. Hoke
*Attorney, Agent, or Firm*—Cushman, Darby & Cushman

[57] ABSTRACT

Polymers of olefins are stabilized against ultraviolet light by a synergistic combination of stabilizers including (1) a hydroxybenzophenone and (2) an organotin compound of the formula:

(a) $RnSn(-SR^1 COOR^2) 4-n$,
(b) $RnSn(-S-R^2) 4-n$,
(c) $RnSn(-S R^1 OOCR^2) 4-n$,
(d) $((R)_3 Sn-S)_x R^4 (-Z)_y$, or

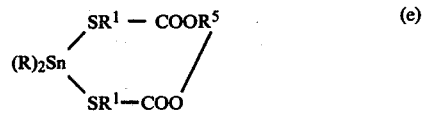 (e)

where R is alkyl, alkenyl, aryl, aralkyl, alkaryl or cycloalkyl, $R^1$ is alkylene, arylene, cycloalkylene, aralkylene or alkarylene, $R^2$ is an alkyl, aryl, aralkyl, alkenyl, alkaryl or cycloalkyl, $R^5$ is alkylene, $R^4$ is aliphatic, aromatic, araliphatic, alkyl substituted aromatic or cycloaliphatic radical of at least 2 carbon atoms and having a free valence of x+y, Z is —OH, —COOH, —COOR$^2$ or —OOCR$^2$ or Z can be a mixture of these radicals if y is greater than 1, x is 1 to 4, y is 0 to 3, x+y is 1 to 4 and n is 1 to 3. Preferably the olefin is polyethylene or polypropylene. Preferably the hydroxybenzophenone also has at least one alkoxy group.

40 Claims, No Drawings

STABILIZED POLYPROPYLENE COMPOSITIONS

The present invention relates to novel olefin polymer compositions containing synergistic ultraviolet light (UV) stabilizers.

Tin mercaptides are well known thermal stabilizers for polyvinyl chloride. However, they have not been reported as having UV stabilizer properties. It has now been found that organotin sulfides having a tin-carbon bond and a tin-sulfur bond are UV stabilizers for olefin polymers, and particularly solid polymers of alpha olefins. It is surprising that this is so since many other types of tin compounds, e.g. tetraorganotins, organotin carboxylates, stannoxanes, organotin chlorides and tin sulfides that have no tin-carbon bond do not act as UV stabilizers for olefin polymers, e.g. polypropylene.

It has further been found that the organotin sulfides of the invention act synergistically with hydroxybenzophenones, preferably hydroxy alkoxybenzophenones, as UV stabilizers for olefin polymers. By acting synergistically it is meant that the stabilization imparted by the combination of stabilizers is greater than would have been expected by employing either of the stabilizers alone.

As the olefin polymers there are preferably employed homo and copolymers of alpha-olefins such as homopolymers of ethylene, 2-propylene, butene-1, decene-1, 4-methylpentene-1, 3-methylbutene-1, 3,3-dimethylbutene-1, or pentene-1, as well as copolymers of ethylene and propylene (e.g. 50:50, 80:20 and 20:80), ethylene or propylene copolymers with a minor amount of mono-olefins having 4-10 carbon atoms, e.g. ethylenebutene-1 copolymer (95:5), ethylene-decene-1 copolymer (90:10), propylene-butene-1 copolymer (90:10), propylene-decene-1 copolymer (95:5). Of course there can also be employed copolymers with more than two such olefins, e.g. a terpolymer of ethylene, propylene and butene-1, preferably the olefin polymer is polyethylene or polypropylene, most preferably polypropylene.

As organotin sulfides there can be used an organotin compound of the formula:

(a) $R_nSn(SR^1COOR^2)_{4-n}$,
(b) $R_nSn(S-R^2)_{4-n}$,
(c) $R_nSn(SR^1OOCR^2)_{4-n}$,
(d) $((R)_3Sn-S)_xR^4(Z)_y$, or

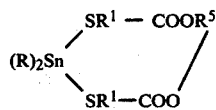
(e)

where R is alkyl, alkenyl, aryl, aralkyl, alkaryl or cycloalkyl, $R^1$ is alkylene, arylene, cycloalkylene, aralkylene or alkarylene, $R^2$ is an alkyl, aryl, aralkyl, alkenyl, alkaryl or cycloalkyl, $R^5$ is alkylene, $R^4$ is aliphatic, aromatic, aralphatic, alkyl substituted aromatic or cycloaliphatic radical of at least 2 carbon atoms and having a free valence of x+y, Z is —OH, —COOH, —COOR$^2$ or —OOCR$^2$ or Z can be a mixture of these radicals if y is greater than 1, x is 1 to 4, y is 0 to 3, with the proviso that when x is 1 and y is 1 and $R^4$ is x+y is 1 to 4 and n is 1 to 3, arylene, cycloalkylene, aralkylene or alkarylene Z is not COOR$^2$ or —OOCR$^2$ and when x is 1 y is not 0. The reason for this proviso is so that formula (d) does not overlap with either formula (a) or (c).

$R^4$ is usually alkylene, arylene, cycloalkylene, aralkylene, or alkarylene.

R can be for example alkyl of 1 to 18 or even 20 carbon atoms, phenyl, naphthyl, benzyl, alkylphenyl having 1 to 18 carbon atoms in the alkyl group, e.g. tolyl, xylyl, ethylphenyl, octadecylphenyl, butylphenyl, isopropylphenyl, anylphenyl, alkenyl of 2 to 18 carbon atoms, e.g. vinyl, allyl, crotyl or oleyl, cyclohexyl or cyclopentyl. $R^2$ can have the same type of groups as R (R and $R^2$ of course can be different), $R^1$ can be alkylene of 1 to 18 carbon atoms, e.g. ethylene, trimethylene, methylene, propylene, tetramethylene, hexamethylene, decamethylene, octadecylene, phenylene, naphthylene, cyclohexylene, cyclopentylene, xylylene, etc. $R^4$ can be as defined for $R^1$ and preferably has at least two carbon atoms, $R^5$ can be alkylene of 2 to 18 carbon atoms.

Examples of organotin compounds within the invention are:
dimethyltin bis (isooctyl thioglycolate),
dimethyltin bis (isooctyl-3-mercaptopropionate),
dimethyltin bis (2-ethylhexylthioglycolate),
dimethyltin bis (2'-ethylhexyl-3-mercaptopropionate),
dimethyltin bis (isooctyl 4-mercaptobutyrate),
dimethyltin bis (n-octyl thioglycolate),
dimethyltin bis (n-octyl-3-mercaptopropionate),
dimethyltin bis (methyl thioglycolate),
dimethyltin bis (methyl 3-mercaptopropionate),
dimethyltin bis (methyl 4-mercaptobutyrate),
dimethyltin bis (propyl 3-thiopropionate),
dimethyltin bis (butyl thioglycolate),
dimethyltin bis (butyl 3-thiopropionate),
dimethyltin bis (butyl-4-thiobutyrate),
dimethyltin bis (isooctyl 2-thiopropionate),
dimethyltin bis (decyl thioglycolate),
dimethyltin bis (dodecyl thioglycolate),
dimethyltin bis (dodecyl 3-thiopropionate),
dimethyltin bis (dodecyl 4-thiobutyrate),
dimethyltin bis (octadecyl thioglycolate),
dimethyltin bis (octadecyl 3-thiopropionate),
dimethyltin bis (octadecyl 4-thiobutyrate),
dimethyltin bis (eicosanyl thioglycolate),
dimethyltin bis (eicosanyl-3-thiopropionate),
dimethyltin bis (cyclopentyl thioglycolate),
dimethyltin bis (cyclohexyl thioglycolate),
dimethyltin bis (cyclohexyl-3-thiopropionate),
dimethyltin bis (benzyl thioglycolate),
dimethyltin bis (benzyl-3-thiopropionate),
dimethyltin bis (phenyl thioglycolate),
dimethyltin bis (p-tolyl-3-thiopropionate),
dimethyltin bis (allyl thioglycolate),
dimethyltin bis (allyl-3-thiopropionate),
dimethyltin bis (allyl-4-thiobutyrate),
dimethyltin bis (crotyl thioglycolate),
dimethyltin bis (oleyl thioglycolate),
dimethyltin bis (oleyl-3-thiopropionate),
dimethyltin bis (oleyl-4-thiobutyrate),
dimethyltin octyl thioglycolate decyl thioglycolate,
dimethyltin bis (methallyl thioglycolate),
dimethyltin bis (methallyl-3-thiopropionate),
dimethyltin bis (dodecenyl thioglycolate),
dimethyltin dimethyl mercaptide,
dimethyltin diethyl mercaptide,
dimethyltin dipropyl mercaptide,
dimethyltin dibutylmercaptide,
dimethyltin diisooctylmercaptide,
dimethyltin di(2-ethylhexyl mercaptide),
dimethyltin dioctyl mercaptide,
dimethyltin didodecyl mercaptide, dimethyltin dioctadecyl mercaptide,
dimethyltin dieicosanyl mercaptide,
dimethyltin diallyl mercaptide,
dimethyltin dioleyl mercaptide,
dimethyltin dicyclohexyl mercaptide,
dimethyltin diphenyl mercaptide,
dimethyltin dibenzyl mercaptide,
dimethyltin ethylene bis thioglycolate
(the reaction product of dimethyltin dichloride with ethylene bis thioglycolate of the formula:

(HSCH$_2$COOCH$_2$CH$_2$OOCCH$_2$SH)

dimethyltin propylene bis (thioglycolate),
dimethyltin trimethylene bis (thioglycolate),
dimethyltin hexamethylene bis (thioglycolate),
dimethyltin ethylene bis (3-thiopropionate),
methyltin tris (isooctyl thioglycolate),
methyltin tris (isooctyl-3-mercaptopropionate),
methyltin tris (2-ethylhexyl-thioglycolate),
methyltin tris (2'-ethylhexyl-3-mercaptopropionate),
methyltin tris (isooctyl-4-mercaptobutyrate),
methyltin tris (n-octyl thioglycolate),
methyltin tris (n-octyl-3-mercaptopropionate),
methyltin tris (methyl thioglycolate),
methyltin tris (methyl-3-mercaptopropionate),
methyltin tris (methyl-4-mercaptobutyrate),
methyltin tris (ethyl thioglycolate),
methyltin tris (propyl-3-thiopropionate),
methyltin tris (butylthioglycolate),
methyltin tris (butyl-3-thiopropionate),
methyltin tris (butyl-4-thiobutyrate),
methyltin tris (isooctyl-2-thiopropionate),
methyltin tris (decyl thioglycolate),
methyltin tris (isodecyl thioglycolate),
methyltin tris (dodecyl thioglycolate),
methyltin tris (dodecyl-3-thiopropionate),
methyltin tris (isodecyl-3-thiopropionate),
methyltin tris (dodecyl-4-thiobutyrate),
methyltin tris (octadecyl thioglycolate),
methyltin tris (octadecyl-3-thiopropionate),
methyltin tris (octadecyl-4-thiobutyrate),
methyltin tris (eicosanyl thioglycolate),
methyltin tris (eicosanyl-3-thiopropionate),
methyltin tris (cyclopentyl thioglycolate),
methyltin tris (cyclohexyl thioglycolate),
methyltin tris (cyclohexyl-3-thiopropionate),
methyltin tris (benzyl thioglycolate),
methyltin tris (benzyl-3-thiopropionate),
methyltin tris (phenyl thioglycolate),
methyltin tris (p-toyl-3-thiopropionate),
methyltin tris (allyl thioglycolate),
methyltin tris (allyl-3-thiopropionate),
methyltin tris (allyl-4-thiobutyrate),
methyltin tris (crotyl thioglycolate),
methyltin tris (oleyl thioglycolate),
methyltin tris (oleyl-3-thiopropionate),
methyltin tris (oleyl-4-thiobutyrate),
methyltin octyl thioglycolate bis(decyl) thioglycolate,
methyltin tris (methallyl thioglycolate),
methyltin tris (methallyl-3-thiopropionate),
methyltin tris (dodecenyl thioglycolate),
methyltin tri(methylmercaptide),
methyltin tri(ethyl mercaptide),
methyltin tri(propyl mercaptide),
methyltin tri(butyl mercaptide),
methyltin tris (isooctyl mercaptide),
methyltin tris (2-ethylhexyl mercaptide),
methyltin tri(octyl mercaptide),
methyltin tris (dodecyl mercaptide),
methyltin tris (octadecyl mercaptide),
diallyltin bis (isooctylthioglycolate),
methyltin tris (eicosanyl mercaptide),
methyltin tris (allyl mercaptide),
allyltin tris (isoctylthioglycolate),
methyltin tris (oleyl mercaptide),
oleyltin tris (isooctyl-3-mercaptopropionate),
methyltin tris (cyclohexyl mercaptide),
methyltin tris (cyclopentyl mercaptide),
methyltin tris (benzyl mercaptide),
methyltin tris (phenyl mercaptide),
methyltin tris (p-tolyl mercaptide),
trimethyltin isooctyl thioglycolate,
trimethyltin isooctyl-3-mercaptopropionate,
trimethyltin 2-ethylhexylthioglycolate,
trimethyltin 2'-ethylhexyl-3-mercaptopropionate,
trimethyltin isooctyl 4-mercaptobutyrate,
trimethyltin n-octyl thioglycolate,
tridimethyltin n-octyl-3-mercaptopropionate,
trimethyltin methyl thioglycolate,
trimethyltin methyl 3-mercaptopropionate,
trimethyltin methyl 4-mercaptobutyrate,
trimethyltin ethylthioglycolate,
trimethyltin propyl 3-thiopropionate,
trimethyltin butyl thioglycolate,
trimethyltin butyl 3-thiopropionate,
trimethyltin butyl-4-thiobutyrate,
trimethyltin isooctyl 2-thiopropionate,
trimethyltin decyl thioglycolate,
trimethyltin dodecyl thioglycolate,
trimethyltin dodecyl 3-thiopropionate,
trimethyltin dodecyl 4-thiobutyrate,
trimethyltin octadecyl thioglycolate,
trimethyltin octadecyl 3-thiopropionate,
trimethyltin octadecyl 4-thiobutyrate,
trimethyltin eicosanyl thioglycolate,
trimethyltin eicosanyl-3-thiopropionate,
trimethyltin cyclopentyl thioglycolate,
trimethyltin cyclohexyl thioglycolate,
trimethyltin cyclohexyl-3-thiopropionate,
trimethyltin benzyl thioglycolate,
trimethyltin benzyl-3-thiopropionate,
trimethyltin phenylthioglycolate,
trimethyltin p-tolyl-3-thiopropionate,
trimethyltin allyl thioglycolate,
trimethyltin allyl-3-thiopropionate,
trimethyltin allyl-4-thiobutyrate,
trimethyltin crotyl thioglycolate,
trimethyltin oleyl thioglycolate,
trimethyltin oleyl-3-thiopropionate,
trimethyltin oleyl-4-thiobutyrate,
trimethyltin cetyl thioglycolate decyl thioglycolate,
trimethyltin methallyl thioglycolate,
trimethyltin methallyl-3-thiopropionate,
trimethyltin dodecenyl thioglycolate,
trimethyltin methyl mercaptide,
trimethyltin ethyl mercaptide,
trimethyltin propyl mercaptide,
trimethyltin butylmercaptide,
trimethyltin isooctylmercaptide,
trimethyltin 2-ethylhexyl mercaptide,
trimethyltin octyl mercaptide,
trimethyltin dodecyl mercaptide,
trimethyltin octodecyl mercaptide,
trimethyltin eicosanyl mercaptide,
trimethyltin allyl mercaptide, trimethyltin oleyl mercaptide,
trimethyltin cyclohexyl mercaptide,
trimethyltin phenyl mercaptide,
trimethyltin benzyl mercaptide,
  dibutyltin bis (isooctyl thioglycolate),
  dibutyltin bis (lauryl mercaptide),
  dibutyltin bis (isooctyl 3-mercaptopropionate),
  dibutyltin bis (cyclohexyl delta mercaptovalerate),
  dibutyltin di (mercapto butanol trimethylhexanoic acid ester),
  dibutyltin di (mercaptoethanol lauric acid ester),
  tributyltin monothioglycerine dilauryl ester,
  isopropyltin tris (mercaptoethanol trimethyl hexanoic acid ester) (and the other alkyltin mercaptoalcohol monocarboxylic acid esters set forth in Leistner Patents Nos. 2,870,119 and 2,870,182 the entire disclosures of which are hereby incorporated by reference and relied upon),
  dioctyltin bis (lauryl mercaptide),
  dioctadecyltin bis (decyl mercaptide),
  butyltin tris (isooctylthioglycolate),
  butyltin tris (hexyl 3-thiopropionate),
  diphenyltin bis (lauryl mercaptide),
  phenyltin tris (n-octylthioglycolate),
  dibenzyltin bis (isooctylthioglycolate),
  di-p-tolyltin bis (lauryl mercaptide).

In any of the above compounds the methyl, butyl or octyl groups attached to tin can be replaced by any of the other groups included within the definition of R.

As is known in the art compounds of formula (c) and also many of the compounds of formula (d) can be formed by reacting a tin halide of the formula:

$$(R)_n SnX_{4-n} \qquad (f)$$

where X is a halogen of atomic weight 35 to 127 and R and n are as defined above with the ester of a mercaptoalkanol and a carboxylic acid (or in the case of some of the compounds within formula (d) simply reacting with a mercaptoalkanol). Thus as starting material there can be used methyltin trichloride, methyltin tribromide, methyltin triiodide, ethyltin trichloride, butyltin trichloride, butyltin tribromide, butyltin triiodide, sec. butyltin trichloride, octyltin trichloride, benzyltin trichloride, trimethyltin chloride, tributyltin chloride, trioctyltin chloride, dimethyltin dichloride, dimethyltin dibromide, dimethyltin diiodide, dipropyltin dichloride, butyl methyltin dichloride, dibutyltin dichloride, dibutyltin dibromide, dioctyltin diiodide, dioctyltin dichloride, dibenzyltin dichloride, phenyltin trichloride, p-tolyltin trichloride, diphenyltin dichloride, di-p-tolyltin dichloride, cyclohexyltin trichloride, dicyclohexyltin dichloride, cyclopentyltin trichloride, oleyltin trichloride, dioleyltin dichloride, vinyltin trichloride, diallyltin dichloride, allyltin trichloride, eicosanyltin trichloride, octadecyltin trichloride.

As the mercaptoalkanol there can be employed for example mercaptoethanol, 2-thioglycerine, 3-thioglycerine, 3-thiopropanol, 2-thiopropanol, 4-thiobutanol, 18-thiooctadecanol, 9-thiononanol, 8-thiooctanol or 6-thiohexanol. As esters there can be used such mercaptoalkanols with acids such as formic acid, acetic acid, propionic acid, butyric acid, pivalic acid, valeric acid, caprylic acid, caproic acid, decanoic acid, lauric acid, myristic acid, palmitic acid, 2-ethylhexanoic acid, stearic acid, eicosanic acid, oleic acid, linoleic acid, linolenic acid, crotonic acid, methacrylic acid, acrylic acid, cinnamic acid, benzoic acid, p-toluic acid, o-toluic acid, p-t-butyl benzoic acid, enanthic acid, p-n-butylbenzoic acid, cyclohexane carboxylic acid, phenylacetic acid, ricinoleic acid, hydrogenated ricinoleic acid, phenylpropionic acid. Of course, mixtures of acids can be used, e.g. tall oil acids, palmitic acid-stearic acid mixtures ranging from 60:40 to 40:60, soybean oil acids, cottonseed oil acids, hydrogenated cottonseed oil acids, peanut oil acids, coconut oil acids, corn oil acids, castor oil acids, hydrogenated castor oil acids, lard acids, etc.

Illustrative of half esters of polycarboxylic acids which can be esterified with the mercaptoalkanol are mono methyl maleate, monoethyl maleate, monopropyl maleate, monobutyl maleate, monooctyl maleate, mono-2-ethylhexyl maleate, monostearyl maleate, monoethylfumarate, mono methyl oxalate, monoethyl oxalate, monoethyl malonate, monobutyl malonate, monoisopropyl succinate, monomethyl succinate, monomethyl glutarate, monoethyl adipate, monomethyl azelate, monomethyl phthalate, monoethyl phthalate, monoisooctyl phthalate, monoethyl terephthalate.

Illustrative of mercapto esters which can be used for reaction with the tin compound are:
2-mercaptoethyl acetate,
2-mercaptoethyl propionate,
2-mercaptoethyl butyrate,
2-mercaptoethyl valerate,
2-mercaptoethyl pivalate,
2-mercaptoethyl caproate,
2-mercaptoethyl caprylate,
2-mercaptoethyl pelargonate,
2-mercaptoethyl decanoate,
2-mercaptoethyl laurate,
2-mercaptoethyl stearate,
2-mercaptoethyl eiconsanate,
2-mercaptoethyl palmitate,
2-mercaptoethyl oleate,
2-mercaptoethyl ricinoleate,
2-mercaptoethyl linoleate,
2-mercaptoethyl linolenate,
2-mercaptoethyl tallate,
2-mercaptoethyl ester of cottonseed oil acid,
2-mercaptoethyl ester of lard acids,
2-mercaptoethyl ester of coconut oil acids,
2-mercaptoethyl ester of soybean oil acids,
2-mercaptoethyl benzoate,
2-mercaptoethyl p-toluate,
2-mercaptoethyl crotonate,
2-mercaptoethyl cinnamate,
2-mercaptoethyl phenyl acetate,
2-mercaptoethyl phenyl propionate,
2-mercaptoethylmethyl maleate,
2-mercaptoethyl ethyl fumarate,
2-mercaptoethyl butyl oxalate,
2-mercaptoethyl methyl oxalate,
2-mercaptoethyl ethylmalonate,
2-mercaptoethyl methyl succinate,
2-mercaptoethyl methylazelate,
2-mercaptoethylhexyl azelate,
2-mercaptoethyl methyl phthalate,
3-mercaptopropyl pelargonate,
3-mercaptopropyl enanthate,
3-mercaptopropyl stearate,
3-mercaptopropyl oleate,
3-mercaptopropyl ricinoleate,
3-mercaptopropyl ethyl maleate,
3-mercaptopropyl benzoate,
2-thioglyceryl pelargonate, 3-thioglyceryl pelargonate,
6-mercaptohexyl acetate,
7-mercaptoheptyl acetate,
7-mercaptoheptyl propionate,
8-mercaptooctyl acetate,
2-mercaptoethyl cyclohexanoate,
8-mercaptooctyl enanthate,
2-mercaptoethyl cyclopentanoate,
18-mercaptooctadecyl acetate,
18-mercaptooctadecyl enanthate.

When Z is COOH there can be used for reaction with the organotin halide mercaptoacids such as mercaptoacetic acid, alpha mercaptopropionic acid, beta mercaptopionic acid, alpha mercaptobutyric acid, beta mercaptobutyric acid, gamma mercaptobutyric acid, gamma mercapto valeric acid, alpha mercapto valeric acid and beta mercapto valeric acid.

Examples of specific compounds include dimethyltin bis (mercaptoethyl octoate), methyltin tris (mercaptoethyl octoate), trimethyltin mercaptoethyloctoate, dibutyltin bis (3-mercaptopropyl hexanoate), butyltin tris (6-mercaptohexyl acetate), dimethyltin bis (mercaptoethyl acetate), methyltin tris (mercaptoethyl propionate), dioctyltin bis (mercaptoethyl butyrate), tributyltin mercaptoethyl laurate, dibutyltin bis (mercaptoethyl stearate), dimethyltin bis (mercaptoethyl oleate), methyltin tris (mercaptoethyl stearate), dimethyltin bis (mercaptoethyl stearate), dibutyltin bis (mercaptoethyl eicosanate), dimethyltin bis (mercaptoethyl palmitate), methyltin tris (mercaptoethyl ricinoleate), butyltin tris (mercaptoethyl linoleate), dibutyltin bis (mercaptoethyl ricinoleate), dimethyltin bis (mercaptoethyl tallate), dibutyltin bis (mercaptoethyl benzoate), methyltin tris (mercaptoethyl benzoate), dimethyltin bis (mercaptoethyl p-toluate), dibutyltin bis (mercaptoethyl crotonate), tributyltin mercaptoethyl cinnamate, dibutyltin bis (mercaptoethyl phenyl acetate), dimethyltin bis (mercaptoethyl methyl maleate), dibutyltin bis (mercaptoethyl ethyl succinate), dimethyltin bis (mercaptoethyl methyl phthalate), dimethyltin bis (3-mercaptopropyl stearate), dibutyltin bis (2-thioglyceryl pelargonate), methyltin tris (6-mercaptohexyl acetate), dimethyltin bis (mercaptoethyl cyclohexanoate), dimethyltin bis (18-mercaptooctadecyl acetate), dimethyltin bis (mercaptoglycolic acid), dibutyltin bis (3-mercaptopropionic acid), dibutyltin bis (4-mercaptobutyric acid), dimethyltin bis (3-mercaptopropionic acid)methyltin tris (mercaptoglycolic acid), tributyltin mercaptoglycolic acid, dimethyl tin bis (mercaptoethanol) (formula

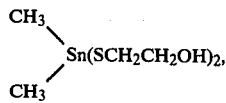

dibutyltin bis (mercaptoethanol), dioctyltin bis (mercaptoethanol), methyltin tris (mercaptoethanol), tributyltin mercaptoethanol, dimethyltin bis (2-thioglycerine), dibutyltin bis (3-thioglycerine), dimethyltin bis (18-thiooctadecanol), dibutyltin bis (3-thiopropanol), dimethyltin bis (2-thiopropanol), tetrakis (tributyltin)pentaerythritol tetrathioglycolate, tetrakis (trimethyltin) pentaerythritol tetrathioglycolate, tetrakis (tributyltin) pentaerythritol tetra (3-mercaptopropionate), tris (tributyltin) trimethylolethane trithioglycolate, tris (tributyltin) glyceryl trithioglycolate, tris (trimethyltin) glyceryl tri (3-mercaptopropionate) tris (trimethyltin) trimethylolpropane trithioglycolate.

Illustrative of compounds within formula (e) are:
dimethyltin ethylene dithioglycolate,
dimethyltin 1,4-butylene dithioglycolate,
dibutyltin ethylene dithioglycolate,
dioctyltin ethylene dithioglycolate,
dimethyltin trimethylene dithioglycolate,
dibutyltin propylene dithioglycolate,
dimethyltin ethylene di(3-mercaptopropionate),
dimethyltin hexamethylene dithioglycolate,
dibutyltin octamethylene dithioglycolate.

As the hydroxybenzophenone there can be used compounds such as 2,4-dihydroxybenzophenone, 2-hydroxybenzophenone, 2,2'-dihydroxybenzophenone or more preferably hydroxyalkoxy benzophenones containing 1 to 3 (or even 4) alkoxy groups with 1 to 18 carbon atoms in each alkoxy group. Examples of such hydroxyalkoxy benzophenones are 2-hydroxy-4-methoxybenzophenone, 2-hydroxy-4-octadecoxybenzophenone, 2,2'-dihydroxy-4-methoxybenzophenone, 2-hydroxy-4-dodecoxybenzophenone, 2-hydroxy-4-n-octoxybenzophenone, 2-hydroxy-4-isooctoxybenzophenone, liquid 2-hydroxy-4-isoalkoxybenzophenones having 6 to 10 carbon atoms in the alkoxy group such as described in Hechenbleikner U.S. Pat. No. 3,658,910 the entire disclosure of which is hereby incorporated by reference are relied upon. Such liquid hydroxyalkoxybenzophenones include 2-hydroxy-4-isohexoxybenzophenone, 2-hydroxy-4-isoheptoxybenzophenone, 2-hydroxy-4-isooctoxybenzophenone, 2-hydroxy-4-isononoxybenzone and 2-hydroxy-4-isodecoxybenzophenone which have been prepared by reacting an "oxo" alkyl halide with 2,4-dihydroxybenzophenone. Other hydroxybenzophenones which can be used in the invention include 2,2'-dihydroxy-4-n-octoxybenzophenone, 2-hydroxy-4-butoxybenzophenone, 4'-chloro-2-hydroxy-4-octoxybenzophenone, 2,4-dibenzoyl resorcinol, 2,2'-dihydroxy-4,4'-dimethoxybenzophenone, 2,2', 4,4'-tetrahydroxybenzophenone, 2,2'-dihydroxy-4-butoxybenzophenone, 2,2'-dihydroxy-4-dodecoxybenzophenone, 2,2'-dihydroxy-4,4'-diethoxybenzophenone, 2,2'-dihydroxy-4-heptadecoxybenzophenone, 2-hydroxy-4-n-heptoxybenzophenone, 2-hydroxy-4-methoxy-4'-methylbenzophenone, 2-hydroxy-2',4,4'-trimethoxybenzophenone, 2,2'-dihydroxy-4,4'-dioctoxybenzophenone, 2,2'4-trihydroxy-4-methoxybenzophenone, 2-hydroxy-4,4-di-methoxybenzophenone, 2-hydroxy-4-methoxy-4'-chlorobenzophenone, 2-hydroxy-4-methoxy-2',4'-dichlorobenzophenone, 2,2'-dihydroxy-4,4'-didodecoxybenzophenone, 2-hydroxy-2,4,4'-trioctoxybenzophenone, 2-hydroxy-5-chlorobenzophenone.

The synergistic combination of organotin compound and hydroxybenzophenone is usually employed in an amount of 0.01 to 3% by weight of the olefin polymer but this can be varied e.g. there can be used 5% of the combination based on the weight of the polymer. The ratio of organotin compound to hydroxybenzophenone can vary from 10:90 to 90:10 by weight more preferably from 75:25 to 25:75 but usually is 50:50 by weight.

In the working examples below employing polypropylene unless otherwise indicated there was employed 0.5 part of stabilizer per 100 parts of polypropylene. Thus if there was used only 2-hydroxy-4-octoxybenzophenone with polypropylene (a comparison example) there was employed 0.5 part of 2-hydroxy-4-octoxybenzophenone per 100 parts of polypropylene whereas if there was employed a synergistic mixture according to the invention there would be used 0.25 part of 2-hydroxy-4-octoxybenzophenone with 0.25 part of dimethyltin bis (isooctylthioglycolate) for example. If two organotin compounds were used together the percentage of each is of the 0.25 part, e.g. if a mixture of 90% methyltin tris (mercaptoethyl octoate and 10% dimethyltin bis (mercaptoethyl octoate) was employed this means there was 0.225 part of the methyltin compound and 0.025 part of the dimethyltin compound.

There can also be included in the composition conventional additives for the olefin polymer. Thus, there can also be added phenolic antioxidants in an amount of 0.01–10%. Examples of such phenols include 2,6-di-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'butylidene bis (6-t-butyl-m-cresol), hydroquinone monobenzyl ether, 2,2'-methylene-bis (4-methyl-6-t-butyl-phenol), 2,6-di-butyl-4-decyloxyphenol, 2-6-butyl-4-dodecyloxyphenol, 2-t-butyl-4-octadecyloxyphenol, 4,4'-methylenebis(2,6-t-butylphenol), p-aminophenol, N-lauryloxy-p-aminophenol, 4,4'-thiobis(3-methyl-6-t-butylphenol), bis[o-(1,1,3,3-tetramethylbutyl)phenol] sulfide, A stage p-t-butylphenolformaldehyde resin. Irganox 1010 (tetrakis [methylene-3-(3,5-di-t-butyl-4'-hydroxyphenyl)propionate]methane), 2,4,6-tri(4-hydroxy-3,5-di-t-butylbenzyl) mesitylene, 2,2'-methylene-bis(4-ethyl-6-t-butylphenol), octadecyl-(3,5-di-t-butyl hydroxyphenyl) propionate (Irganox 1076). Such phenolic antioxidants generally are hindered phenols.

There can also be included conventional sulfur containing compounds as stabilizers for the olefin polymers. Thus there can be employed therewith neutral sulfur compounds having a thio linkage beta to a carbon atom having both a hydrogen atom and a carboxyl group attached thereto. Such compounds are used in an amount of 0.01 to 10%, preferably 0.1–5%. Thus there can be used pentaerythritol tetra(mercaptoacetate), 1,1,1-trimethylolethane tri(mercaptoacetate), 1,1,1-trimethylopropane tri(mercaptoacetate), dioleyl thiodiproprionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butyl-mercapto propionic acid, lauryl ester of 3-laurylmercaptopropionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexymercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiosebacate, dilauryl-4,7,8,11-tetrathiotetradecandioate, dimyristyl-4,11-dithiotetradecandioate,lauryl-3-benzothiazyl-mercaptopropionate. Preferably the esterifying alcohol is a alkanol having 10 to 18 carbon atoms. Other esters of beta thiocarboxylic acids set forth in Gribbins U.S. Pat. 2,519,744 can also be used.

Unless otherwise indicated all parts and percentages are by weight. The compositions of the invention can comprise, consist essentially of or consist of the materials set forth.

STABILIZERS TESTS IN POLYPROPYLENE

A commercial sample of crystalline polypropylene was thoroughly mixed with 0.5% of Irganox 1010 (a hindered phenolic antioxidant), 0.15% distearylthiodipropionate and 0.5% of UV stabilizers. Mixing was continued on a 2-roll mill at 340° F. for 10 minutes. The resulting sheet was cut into squares and compression molded at 350° F. for 8 minutes. The molded squares (30 mils thick) were annealed to 10 minutes in a 300° F. oven and then cut into strips and placed in an Atlas Two Arc Weatherometer. After each 100 hours of exposure a specimen was removed and subjected to a 180° bending test to determine embrittlement. The test is terminated after 2 consecutive breaks. Color development in the specimen was also noted and used as an added criterion of UV degradation. The results appear in Table I. Sample 9 identified as "No Stabilizer" contained only the Irganox 1010 and distearylthiodipropionate.

TABLE 1

TESTS IN POLYPROPYLENE

| EX. | UV STABILIZERS | ATLAS WEATHEROMETER EXPOSURE HOURS TO OBTAIN 2 BREAKS | color |
|---|---|---|---|
| 1 | 2-Hydroxy-4-octoxybenzophenone. | 400 | Brown |
| 2 | 75% Dimethyltin bis-isooctyl-thioglycolate 25% Monomethyltin tris-isooctyl-thioglycolate | 500 | Yellow |
| 3 | 50% Dimethyltin bis-isooctyl-thioglycolate 50% Monomethyltin tris-isooctyl-thioglycolate | 500 | Yellow |
| 4 | 90% Methyltin tris-isooctyl thioglycolate 10% Dimethyltin bis-isooctyl-thioglycolate | 400 | Yellow |
| 5 | 75% Dimethyltin bis-mercapto- | 500 | Yellow |

TABLE 1-continued
TESTS IN POLYPROPYLENE

| EX. | UV STABILIZERS | ATLAS WEATHEROMETER EXPOSURE HOURS TO OBTAIN 2 BREAKS | color |
|---|---|---|---|
| | ethyloctoate | | |
| | 25% Monomethyltin tris-mercapto-ethyloctoate | | |
| 6 | 90% Methyltin tris-mercapto-ethyloctoate | 400 | Yellow |
| | 10% Dimethyltin bis-mercapto-ethyloctoate | | |
| 7 | 95% Dibutyltin bis-isooctyl-thioglycolate | 400 | Yellow |
| | 5% Monobutyltin tris-isooctyl-thioglycolate | | |
| 8 | 90% Monobutyltin tris-isooctyl-thioglycolate | 400 | Yellow |
| | 10% Dibutyltin bis-isooctyl-thioglycolate | | |
| 9 | No Stabilizer | 200 | Yellow |
| 10 | 95% Dibutyltin bis-mercapto-ethyloctoate | 400 | Yellow |
| | 5% Monobutyltin tris-mercapto-ethyloctoate | | |
| 11 | 90% Dioctyltin bis-issoctyl-thioglycolate | 400 | Yellow |
| | 10% Monooctyltin tris-issoctyl-thioglycolate | | |
| 12 | 93% Trioctyltin issoctyl-thioglycolate | 400 | Yellow |
| | 7% Dioctyltin bis-issoctyl-thioglycolate | | |
| 13 | 90% Tributyltin issoctyl-thioglycolate | 400 | Yellow |
| | 10% Dioctyltin bis-issoctyl-thioglycolate | | |
| 14 | Dibutyltin mercaptopropionate | 500 | Nearly Colorless |
| 15 | Dibutyltin thioglycolate | 500 | Nearly Colorless |
| 16 | 90% Dimethyltin bis-isooctylmercapto-propionate | 400 | Yellow |
| | 10% Monomethyltin tris-issoctyl-mercaptopropionate | | |
| 17 | 80% Dimethyltin bis-lauryl-mercaptide | 700 | Yellow |
| | 20% Monomethyltin tris-lauryl-mercaptide | | |
| 18 | 80% Dimethyltin bis-stearyl-mercaptide | 600 | Yellow |
| | 20% Monomethyltin tris-stearyl-mercaptide | | |
| 19 | Dimethyltin ethylenedithioglycolate | 600 | Yellow |
| 20 | Dimethyltin 1,4-butylenedithio-glycolate | 600 | Yellow |
| 21 | 50-50 Mixture of Examples 1 and 2 stabilizers | 600 | Yellow |
| 22 | 50-50 Mixture of Examples 1 and 17 stabilizers | 800 | Yellow |
| 23 | 50-50 Mixture of Examples 1 and 14 stabilizers | 600 | Yellow |
| 24 | Tetrakis (tributyltin) penta-erythritol tetrathioglycolate | 600 | Yellow |
| 25 | Tris (tributyltin) glyceryl trithioglycolate | 500 | Yellow |
| 26 | Tetrakis (tributyltin) penta-erythritol tetramercaptopropionate | 500 | Yellow |
| 27 | Dibutyltin dilaurate | 200 | Yellow |
| 28 | Dioctyltin dichloride | 200 | Yellow |
| 29 | Tin tetrakis (isooctylthioglycolate) | 200 | Brown |
| 30 | Tetrabutyltin | 200 | Yellow |
| 31 | 2,4-Dihydroxybenzophenone | 200 | Brown |
| 32 | 2-Hydroxy-4-methoxybenzophenone | 300 | Amber |
| 33 | 2,2'-Dihydroxy-4-methoxy-benzophenone | 300 | Brown |
| 34 | 2-Hydroxy-4-dodecoxy-benzophenone | 400 | Yellow |
| 35 | 75-25 Mix re of Examples 1 and | 500 | Yellow |

TABLE 1-continued
TESTS IN POLYPROPYLENE

| EX. | UV STABILIZERS | ATLAS WEATHEROMETER EXPOSURE | |
|---|---|---|---|
| | | HOURS TO OBTAIN 2 BREAKS | color |
| 36 | 25-75 Mixture of Examples 1 and 2 stabilizers | 600 | Yellow |
| 37 | 80-20 Mixture of Examples 1 and 17 stabilizers | 600 | Yellow |
| 38 | 20-30 Mixture of Examples 1 and 17 stabilizers | 700 | Yellow |
| 39 | 50-50 Mixture of Examples 31 and 17 stabilizers | 500 | Amber |
| 40 | 50-50 Mixture of Examples 32 and 17 stabilizers | 600 | Amber |
| 41 | 50-50 Mixture of Examples 32 and 17 stabilizers | 600 | Amber |
| 42 | 50-50 Mixture of Examples 33 and 17 stabilizers | 600 | Amber |
| 43 | 50-50 Mixture of Examples 34 and 17 stabilizers | 800 | Yellow |
| 44 | 50-50 Mixture of Examples 34 and 11 stabilizers | 600 | Yellow |
| 45 | 50-50 Mixture of Examples 34 and 3 stabilizers | 600 | Yellow |
| 46 | 50-50 Mixture of Examples 1 and 19 Stabilizers | 700 | Yellow |

EXAMPLE 47

High density polyethylene (Phillips BMNTR-880) was milled at 260° C. with 0.02% Irganox 1010, 0.06% distearylthiodipropionate and 0.5% dimethyltin bis-laurylmercaptide. Molded into a 30 mil thick square, the specimen was cut into strips and exposed in the Atlas Weatherometer. Samples were removed at 100-hour intervals and subjected to a 180° bending test. The test was terminated after two consecutive breaks. This specimen went for 500 hours.

EXAMPLE 48

This example was the same as Example 47 except that 0.5% of 2-hydroxy-4-octoxybenzophenone was used as the UV stabilizer. Two breaks occurred after 400 hours.

EXAMPLE 49

This example was the same as Example 47 but using 0.25% of 2-hydroxy-4-octoxybenzophenone and 0.25% of dimethyltin bis-laurylmercaptide as the UV Stabilizer. Two breaks occurred after 600 hours.

The following examples in Table II show the effect of additive concentration. There was used the same procedure as in Examples 1-49 for mixing the materials, the only change being in the stabilizer concentration.

TABLE II

| EXAMPLE | UV STABILIZER | CONCENTRATION PARTS PER HUNDRED RESIN | HOURS TO OBTAIN 2 BREAKS | COLOR |
|---|---|---|---|---|
| 50 | Same as Example 21 | 0.2 | 350 | Yellow |
| 51 | Same as Example 21 | 0.05 | 250 | Yellow |
| 52 | Same as Example 21 | 1.0 | 700 | Light Amber |
| 53 | Same as Example 21 | 3.0 | 850 | Light Amber |
| 54 | Same as Example 22 | 0.01 | 225 | Yellow |
| 55 | Same as Example 22 | 2.5 | 900 | Light Amber |

The following Examples 56-65 set forth in Table III are reference examples for the synergy disclosed in Examples 50 through 55. At the lower stabilizer levels of Examples 50-65 the polypropylene test pieces were inspected and bent every 25 hours rather than the usual 100-hour intervals. A reexamination of unstabilized polypropylene on this basis (Example 9) disclosed two breaks after 50 hours.

TABLE III

| EXAMPLE | UV STABILIZER | CONCENTRATION PARTS PER HUNDRED RESIN | HOURS TO OBTAIN 2 BREAKS | COLOR |
|---|---|---|---|---|
| 56 | Same as Example 1 | 0.2 | 250 | Yellow |
| 57 | Same as Example 2 | 0.2 | 300 | Yellow |
| 58 | Same as Example 1 | 0.05 | 100 | Yellow |
| 59 | Same as Example 2 | 0.05 | 150 | Yellow |
| 60 | Same as Example 1 | 3.0 | 600 | Brown |
| 61 | Same as Example 2 | 3.0 | 750 | Brown |
| 62 | Same as Example 1 | 0.01 | 75 | Yellow |
| 63 | Same as Example 17 | 0.01 | 150 | Yellow |

TABLE III-continued

| EXAMPLE | UV STABILIZER | CONCENTRATION PARTS PER HUNDRED RESIN | HOURS TO OBTAIN 2 BREAKS | COLOR |
|---|---|---|---|---|
| 64 | Same as Example 1 | 2.5 | 600 | Brown |
| 65 | Same as Example 17 | 2.5 | 800 | Brown |

In Example 21 in place of using the organotin component of Example 2 there can be used for example any of the organotin compounds of Examples 3, 4, 5, 6, 7, 8, 10, 11, 12, 13, 14, 15, 16, 17, 18, 20, 24, 25 or 26.

Examples 27, 28, 29 and 30 illustrate the fact that certain organotin compounds outside the invention are not UV stabilizers for polypropylene.

The hydroxybenzophenone and organotinsulfide compound are each used in the mixture in an amount sufficient to provide increased stability to UV light to the olefin polymer over either one used alone. The stabilizer combination is also used in an amount sufficient to act as a UV stabilizer for the olefin polymer.

What is claimed is:

1. A composition comprising polypropylene stabilized against ultraviolet light by a stabilizingly effective amount of a synergistic mixture of (1) a 2-hydroxybenzophenone and (2) an organotin compound of the formula:

(a) $RnSn+SR^1 COOR^2) 4-n$,
    (b) $RnSn+S-R^2) 4-n$,
    (c) $RnSn+S R^1 OOCR^2) 4-n$,
    (d) $((R)_3Sn-S)_x R_4+Z)_y$, or

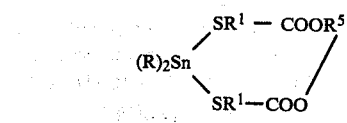

where R is alkyl, aryl, alkenyl, alkaryl, alkaryl or cycloalkyl, $R^1$ is alkylene, arylene, cycloalkylene, aralkylene or alkarylene, $R^2$ is an alkyl, aryl, aralkyl, alkenyl, alaryl or cycloalkyl, $R^5$ is alkylene, $R^4$ is aliphatic, aromatic, araliphatic, alkyl substituted aromatic or cycloaliphatic radical and having a free valence of x+y, Z is —OH, —COOH, —COOR$^2$ or —OOCR$^2$, x is 1 to 4, y is 0 to 3, x+y is 1 to 4 and n is 1 to 3, with the proviso that when x is 1 and y is 1 and $R^4$ is alkylene, arylene, cycloalkylene, aralkylene or alkarylene Z is not COOR$^2$ or —OOCR$^2$ and when x is 1 y is not 0.

2. A composition according to claim 1 wherein (1) is an unsubstituted hydroxybenzophenone or an alkoxy substituted 2-hydroxybenzophenone, the alkoxy group having 1 to 18 carbon atoms and wherein in organotin compound (2) $R^4$ is alkylene, arylene, aralkylene, cycloalkylene, or alkarylene.

3. A composition according to claim 2 wherein R is alkyl of 1 to 20 carbon atoms, phenol, naphthyl, benzyl, alkylphenyl having 1 to 18 carbon atoms in the alkyl group, alkenyl of 2 to 18 carbon atoms, cyclohexyl or cyclopentyl, $R^2$ is alkyl of 1 to 20 carbon atoms, phenyl, naphthyl, benzyl, alkylphenyl having 1 to 18 carbon atoms in the alkyl group, alkenyl of 2 to 18 carbon atoms, cyclohexyl or cyclopentyl, $R^1$ is alkylene of 1 to 18 carbon atoms, phenylene, naphthylene, cyclohexylene, cyclopentylene or xylylene, $R^4$ is alkylene of 1 to 18 carbon atoms, phenylene, naphthylene, cyclohexylene, cyclopentylene or xylylene and $R^5$ is alkylene of 2 to 18 carbon atoms.

4. A composition according to claim 3 wherein R is alkyl of 1 to 8 carbon atoms.

5. A composition according to claim 4 wherein $R^2$ is alkyl of 1 to 18 carbon atoms, $R^1$ is alkylene of 1 to 5 carbon atoms, $R^4$ is alkylene of 2 to 18 carbon atoms and $R^5$ is alkylene of 2 to 18 carbon atoms.

6. A composition according to claim 5 wherein (2) is a mixture of two compounds in one of which n is 1 and in the other of which n is 2.

7. A composition according to claim 5 wherein n is 1 or 2.

8. A composition according to claim 5 wherein (2) is (a).

9. A composition according to claim 8 wherein $R^1$ is alkylene of 1 to 2 carbon atoms.

10. A composition according to claim 9 wherein (1) is 2-hydroxyalkoxybenzophenone.

11. A composition according to claim 10 wherein (1) is 2,2'-dihydroxy-4-alkoxy-benzophenone.

12. A composition according to claim 10 wherein (1) is 2-hydroxy-4-alkoxybenzophenone.

13. A composition according to claim 18 wherein the alkoxy group has 8 to 12 carbon atoms.

14. A composition according to claim 5 wherein (2) is (b).

15. A composition according to claim 14 wherein (1) is 2-hydroxyalkoxybenzophenone and R is methyl or butyl.

16. A composition according to claim 15 wherein (1) is 2,2'-dihydroxy-4-alkoxy-benzophenone.

17. A composition according to claim 15 wherein (1) is 2-hydroxy-4-alkoxybenzophenone.

18. A composition according to claim 17 wherein the alkoxy group has 8 to 18 carbon atoms.

19. A composition according to claim 5 wherein (2) is (c).

20. A composition according to claim 19 wherein $R^1$ is alkylene of 2 to 5 carbon atoms.

21. A composition according to claim 20 wherein (1) is 2-hydroxyalkoxybenzophenone.

22. A composition according to claim 21 wherein (1) is 2,2'-dihydroxy-4-alkoxybenzophenone.

23. A composition according to claim 21 wherein (1) is 2-hydroxy-4-alkoxybenzophenone.

24. A composition according to claim 23 wherein the alkoxy group has 8 to 18 carbon atoms.

25. A composition according to claim 5 wherein (2) is (d).

26. A composition according to claim 25 wherein $R^4$ is alkylene of 2 to 6 carbon atoms.

27. A composition according to claim 26 wherein (1) is 2-hydroxyalkoxybenzophenone.

28. A composition according to claim 27 wherein (1) is 2,2'-dihydroxy-4-alkoxybenzophenone.

29. A composition according to claim 27 wherein (1) is 2-hydroxy-4-alkoxybenzophenone.

30. A composition according to claim 29 wherein the alkoxy group has 8 to 18 carbon atoms.

31. A composition according to claim 26 wherein $R^4$ is alkylene of 2 to 6 carbon atoms and Z is —OH.

32. A composition according to claim 26 wherein $R^4$ is alkylene of 1 to 2 carbon atoms and Z is —COOH.

33. A composition according to claim 5 wherein (2) is (e).

34. A composition according to claim 33 wherein $R^5$ is alkylene of 2 to 6 carbon atoms.

35. A composition according to claim 34 wherein (1) is 2-hydroxyalkoxybenzophenone and R is methyl or butyl.

36. A composition according to claim 35 wherein (1) is 2,2'-dihydroxy-4-alkoxybenzophenone.

37. A composition according to claim 35 wherein (1) is 2-hydroxy-4-alkoxybenzophenone.

38. A composition according to claim 37 wherein the alkoxy group has 8 to 18 carbon atoms.

39. A composition according to claim 5 wherein the synergistic combination of stabilizers is present in an amount of 0.01 to 3% by weight of the polypropylene.

40. A composition according to claim 39 wherein (1) is 10 to 90% and (2) is 90 to 10% of the total weight of (1) and (2).

* * * * *